3,575,873
THERMAL IMAGE INSPECTION PAINT
David Carver, Van Nuys, Calif., assignor to Lockheed
Aircraft Corporation, Burbank, Calif.
No Drawing. Filed Feb. 15, 1968, Ser. No. 705,618
Int. Cl. C09k 1/00; F21k 2/00
U.S. Cl. 252—301.3
8 Claims

ABSTRACT OF THE DISCLOSURE

Formulations are provided for contact thermographic coatings of a type particularly applicable for nondestructive testing of bonded structures. A heat-sensitive (thermographic) phosphor is uniformly dispersed in a vehicle of a type which will not degrade the phosphor's properties or the transmittance of the exciting ultraviolet radiation. The vehicle further provides good adherence and other desirable coating properties. Alternative formulations, including both water-base and organic-solvent base formulations, as well as a strippable (peel coat) version which may be removed from the substrate as a continuous sheet, are provided.

BACKGROUND OF THE INVENTION

The invention relates to paints, for use in contact thermography, having improved characteristics permitting the paint to be easily applied by means of a brush, paint roller or sprayer. Thermography is a method of measuring surface temperature using luminescent materials. In contact thermography a thin layer of a temperature-sensitive luminescent material is spread on the surface of an object and is excited by ultraviolet (UV) radiation in a darkened room. The luminescent material radiantly reemits the absorbed UV energy at a wavelength in the visible portion of the spectrum. The brightness of the coating indicates the surface temperature and provides a pattern of isotherms over the entire surface at one time.

Thermographic paints have been employed heretofore in the test of bonded and laminated structures. These paints consisted of a superlinear (Lenard) phosphor and a lacquer carrier. The technique for their use is similar to that of the improved formulation of the present invention. If the intensity of the visible fluorescence of the phosphor is graphically plotted as a function of temperature, there is a portion of the curve that shows an appreciable decrease in fluorescent brightness as the temperature increases. Superlinear phosphor have been developed to emphasize this variation so that a small change in temperature produces a relatively large change in fluorescent brightness. Such a phosphor may comprise a sulfide of a metal activated by trace percentages of other metals. Thus, with constant intensity of ultarviolet radiation, the phosphor's reemission may change by as much as 10 percent per degree Fahrenheit. This property is used in nondestructive testing to create a visible heat emission pattern or temperature profile of a given structure. The phosphor-coated surface of the structure is irradiated with both infrared and ultraviolet radiation. The infrared radiation will so degrade the reemission efficiency of the phosphor as to quench it in those areas where a threshold temperature is reached. In the cooler areas the coating will visibly fluoresce under the ultraviolet radiation. In those areas where there is an appreciable heat sink, the local temperature will be maintained at a sufficiently low temperature to result in visible fluorescence. Variations in temperature are indicated on a continuous brightness scale, including time variations. Hot spots will appear as shadows or darkened areas in the fluorescing field.

Another application is in the design of airplane wings. A model of a wing can be painted with the thermographic paint and then placed in a wind tunnel. Any turbulence or uneven air flow over the wing model will produce localized heating or cooling and this can easily be seen by the change in brightness of the paint.

Obtaining a suitable vehicle or carrier for the phosphor has, heretofore, posed certain problems since almost all paint vehicles undesirably block the transmission of ultraviolet radiation or otherwies adversely affect the properties of the phosphor. Also, the luminescence of a phosphor may be seriously degraded by impurities in concentrations of the order of magnitude of a few parts per million. Those vehicles which have been found to be satisfactory with respect to chemical compatibility with the phosphor have had undesirable mechanical properties. The most notable of these undesirable properties is the inability of the vehicle to maintain the relatively heavy, granular phosphor particles in suspension. There is a minimum practical grain size for an operative phosphor, and this size is large enough to cause difficulty in maining a slurry. To overcome this shortcoming it has been proposed heretofore to continuously agitate the phosphor vehicle mixture during its application in order to maintain a satisfactory dispersion. This has been burdensome and frequently failed to achieve a uniform coating.

Still another problem area of prior paints relates to their insulating properties. A coating acting as a temperature sensitive element, indicates its own temperature. This may or may not sufficiently approximate that which the surface would have attained in its absence. Thus, on metallic bodies, the coating behaves as an outer layer of thermal insulation. It can, however, be made as thin as the grain size of the powdered phosphor. Thus, the thermal properties of the coating are important criteria in the formulation of a thermographic paint. Although phosphors cannot be reduced to extremely fine powders without adversely effecting either ability to fluoresce, coatings of the order of 0.001 inch thick are feasibly by means of the present invention.

Still another shortcoming of prior thermographic paints is the fact that they have been difficult to remove from the surface of the test structure once the test or inspection has been completed. That is, prior coatings have required the use of expensive and marginally-effective solvents to remove the coating. At best, removal by means of a solvent is time-consuming and inconvenient.

The above discussed shortcomings of the prior art have been overcome by the present invention, and certain other advantages are additionally provided.

SUMMARY OF THE INVENTION

The present invention comprises a stable dispersion of a thermographic phosphor in an ultraviolet-transmitting vehicle which may be readily applied as a uniform coating to a test surface and thereafter removed from the test surface without difficulty. Both water-based (latex) and organic-solvent based (organosol) vehicles are provided, and a self-adhering, strippable formulation is available in either the water or organic-solvent based systems.

It is therefore an object of the present invention to provide a novel and improved thermal image inspection paint which may be uniformly applied and readily removed from a substrate.

Another object of the present invention is to provide a novel and improved formulation for contact thermographic inspection paints.

Yet another object of the present invention is to provide a novel and improved vehicle for thermographic phosphors which will maintain a stable suspension of said phosphors in a slurry yet which will not adversely affect the transmittance of activating radiation.

An object of the invention is to provide a novel and improved method of nondestructive testing of structures wherein certain isotherms, made visible by irradiation of a thermographic coating on the test structure, are permanently marked on the coating and thereafter the marked coating is removed from the structure as an integral record sheet.

Still another object of the present invention is to provide a novel and improved luminescent paint which overcomes the shortcomings of similar compositions heretofore proposed for generally similar use.

DESCRIPTION OF THE PREFERRED EMBODIMENT

The invention will be further illustrated by means of twelve examples of compositions suitable for carrying out the objects of the invention. These examples are representative of the several kinds of resins upon which the formulations may be based and include cellulose lacquers, polystyrene, acrylics, polyurethane, and silicones. The formulation of Example I comprises a stable phosphor dispersion in an ultraviolet transmitting vehicle, suitable for packaging in a pressurized aerosol spray container. The next two examples relate to strippable versions each having a vehicle which is compatible with a different kind of thinner. The air-dried coatings obtainable from Examples II and III are so-called "peel coats" which may be selectively removed from the substrate as an integral sheet. Modifications of the three basic types of formulations of Examples I-III, are found in Examples IV-XII.

A number of temperature-sensitive phosphors exist which are suitable for inclusion in the coating formulation of the present invention. These include zinc sulfide, zinc-cadmium sulfide, and zinc-cadmium selenide phosphors. The activating agent in each of the above-mentioned phosphors may be silver-nickel. A preferred superlinear phosphor is a zinc-cadmium sulfide phosphor comprising: 50% ZnS, 50% CdS, 2% NaCl, 400 p.p.m. Ag, 1.0 p.p.m. Ni; fired at 1090° C. for 30 minutes. It is excited by 3650 A. UV radiation and gives about 20 percent brightness change per degree centigrade.

Each of the exemplary formulations comprises a UV-transmitting resin, a dispersant or suspension agent, a thickening agent, and a thermographic phosphor. These are the basic constituents of the compositions comprising the invention. The dispersant may function to wet the phosphor particles, since the phosphor is insoluble and thus requires wetting. Additionally, the formulations may include an emulsifying or additional wetting agent, a thermal stabilizer, and a defoamer. The alcohols included in certain of the exemplary formulations given below, serve as deflocculating agents to aid in the prevention of agglomeration of the phosphor particles. The examples given include film formation with solvent-type resins (Example I), and film formation with dispersion resins (Examples II and III). In Example II the binder is dispersed in water, and in Example III the thinner comprises a mixture of toluene and acetone to form an organosol.

Examples VII and VIII comprise acrylic-based coatings, a single polymer resin being used in Example VII and a mixed polymer resin being used in Example VIII. Example IX is based on a chlorinated natural rubber vehicle. A polyurethane resin is exemplified by Example X. Silicone resins are employed in Examples XI and XII. The phosphor described in Example I is suitable for use in Examples II through XII.

Example I

Parts by weight

Part A:

| | |
|---|---|
| Powdered thermographic phosphor, 9 micron average particle size (U.S. Radium Corp., Radelin 1807) | 30 to 50 |
| Fumed silica (Godfrey L. Cabot, Inc., Cab-o-sil) | 8 |
| Acrylic lacquer | 400 |
| Caestor oil derivative suspension aid (Baker Castor Oil Co., MPA Thixotrope) | 2 |

Part B (Thinner and propellant):

| | |
|---|---|
| Methyl isobutyl ketone | 20 |
| Butyl alcohol | 10 |
| Fumed silica (Godfrey L. Cabot, Inc., Cab-o-sil) | 8 |
| Petroleum ether (Standard Oil Co. Low flash naphtha, SO200) | 20 |
| Freon 12 (propellant) | 90 |
| Part A | 60 |

The essential elements of the foregoing Example I may be expressed in terms of percentages of the constituents, by weight, as follows:

1–3.25% powdered thermographic phosphor,
0–0.52% fumed silica,
13–26% acrylic lacquer,
0–0.13% castor oil derivative suspension agent,
0–10% methyl isobutyl ketone,
0–5% butyl alcohol,
0–10% petroleum ether, and
the balance being essentially all compressed gas propellant.

Example II—Water based latex peel coat

| | Grams per gallon |
|---|---|
| Acrylic polymer emulsion (Rhoplex C-72, Rohm & Hass Co.) | 1877 |
| Acrylic emulsion polymer (Rhoplex AC-73, Rohm & Haas Co.) | 1000 |
| Water (dispersant) | 149 |
| Thickening agent (Hercules Powder Co., Natrosol 250 HR) | 10 |
| Alkyl aryl polyether alcohol (emulsifying/wetting agent) (Triton X-15, Rohm & Haas Co.) | 60 |
| Defoamer colloid (John Byce Co., 581) | 7 |
| Phosphor | 492 |

The essential elements of the foregoing Example II may be expressed in terms of percentages of the constituents, by weight, as follows:

0–4% water,
0–0.3% thickening agent,
0–1.7% wetting agent,
0–0.2% defoamer colloid,
6–13.8% powdered thermographic phophor, and
the balance being essentially all acrylic emulsion.

Example III—Solvent-based, organosol, peel coat

| | Grams per gallon |
|---|---|
| Toluene-technical grade (dispersant) | 1260 |
| Acetone-technical grade (diluent) | 1260 |
| Vinyl chloride-vinyl acetate copolyemr resin medium viscosity type (Union Carbide Corp., Bakelite VYHH) [1] | 630 |
| Vinyl chloride-vinyl acetate copolymer resin high viscosity type (Union Carbide Corp., Bakelite VYNS) [2] | 180 |
| Fumed silica (Godfrey L. Cabot, Inc., Cab-o-sil M-5) | 50 |
| Thermal stabilizer (H. M. Royal Co., Mark KCB) | 16.2 |
| Methyl ethyl ketone-technical grade | 300 |
| Phosphor | 455 |

[1] Comprises 86% vinyl chloride, 14% vinyl acetate; specific gravity 1.36.
[2] Comprises 90% vinyl chloride, 10% vinyl acetate; specific gravity 1.36.

The essential elements of the foregoing Example III may be expressed in terms of percentages of the constituents, by weight, as follows:

0–30% toluene dispersant,
0–30% acetone diluent,
0–1.2% fumed silica thickening agent,
0–0.4% thermal stabilizer,
0–7.2% methyl ethyl ketone diluent,
5–11% powered thermographic phosphor, and the balance being essentially all ultraviolet-transmitting vinyl chloride acetate copolymer resin.

Example IV

| | Grams |
|---|---|
| Polystyrene (avg. mol. wt. 20,000 to 40,000 viscosity 30% solution in toluene 10–15 centipoise) | 30 |
| Xylene | 60 |
| Toluene | 35 |
| Methyl isobutyl ketone | 5 |
| Phosphor | 15 |
| Thickening agent: | |
|    Cab-o-Sil M-5 | 1.2 |
|    Ethylene glycol | 0.4 |
|    MPA | .3 to .6 |

Example V

| | Grams |
|---|---|
| Ethyl cellulose lacquer (organo solvent lacquer), ethyl cellulose (ethoxy range 45.0–49.5 containing between 2.25 and 2.58 ethoxy groups/glucose unit) [1] | 100 |
| Castor oil (plasticizer) | 30 |
| Toluene | 100 |
| Xylene | 200 |
| Butanol | 80 |
| Isopropanol | 20 |
| Phosphor | 65 |
| Fumed silica (Cab-o-Sil) | 4.5 |
| Thixotrope (1 to 2% MPA) | 2 |

[1] Viscosity range 7–150 centipoise and preferably 10–100 cps. as determined by 5 wt. percent solution in toluene-ethanol solution.

Example VI

Lacquer Phase:

| | Grams |
|---|---|
| Ethyl cellulose emulsion, ethyl cellulose 10 centipoise (ethoxy content 48.0 to 49.5%) | 100 |
| Dibutyl pthalate | 40 |
| Xylene | 200 |
| Butanol | 50 |
| Phosphor | 70 |

H₂O phase:

| | |
|---|---|
| H₂O (adjusted to PH 8 with NH4OH) | 200 |
| Alkyl aryl sodium sulfonate (Santomeres 3, Monsanto Chemical Co.) | 2 |

Add H₂O phase to lacquer phase slowly with continuous thorough agitation. Viscosity can be increased by addition of CMC or methocel (Dow Chemical Co.) to the water phase.

Example VII

| | Grams |
|---|---|
| Polymer (ethyl methacrylate) | 100 |
| Toluene | 215 |
| Ethyl alcohol | 25 |
| Cellosolve (ethylene glycol mono ethyl ether) | 13 |
| Phosphor | 35 |
| Fumed silica (Cabo-o-Sil) | .5 to 2 |
| Thixotrope (MPA) | .5 to 1.5 |

Example VIII

| | Grams |
|---|---|
| Polymer (ethyl methacrylate) | 75 |
| Polymer (methyl methacrylate) | 25 |
| Toluene | 175 |
| Xylene | 50 |
| Diacetone alcohol | 8 |
| Cellosolve acetate (ethylene glycol mono ethyl ether acetate) | 8 |
| Phosphor | 35 |
| Fumed silica (Cab-o-Sil) | .5 to 2 |
| Thixotrope (MPA) | 1.0 |

Example IX

| | Grams |
|---|---|
| Chlorinated natural rubber—20 centipoise (average chlorine content 67%, "Parlon" Hercules Powder Co.) [1] | 100 |
| Xylene | 320 |
| VM&P naptha | 80 |
| Dibutyl phthalate | 30 |
| Phosphor | 35 |
| Fumed silica (Cab-o-Sil) | .7 |
| Thixotrope (MPA) | .5 |

[1] Viscosity range of 5–125 centipoise and preferably 10–125 centipoise-Viscosity determined using 20% Parlon in toluene @ 250° C.

Example X

Part A—Base resin (cured by atmospheric moisture after evaporation of solvent):

| | Grams |
|---|---|
| Polypropylene glycol (M.W. 1000) | 1000 |
| 1,3-butane diol | 90 |
| Trimethylol propane | 268 |
| Toluene disocyanate | 1400 |

Part B—Lacquer:

| | |
|---|---|
| "Base resin" | 100 |
| Xylene | 75 |
| Cellosolve acetate | 25 |
| Phosphor | 40 |
| Ethyl cellulose | 2 |

Example XI

| | Grams |
|---|---|
| Short oil alkyd resin (7310-x-50 Archer Daniel Midlands) | 1816 |
| Silicone resin solution (Dow Corning 840 Silicone) | 1589 |
| Phosphor | 454 |
| Fumed silica (Cab-o-Sil) | 182 |

Mill on Cowles 10 minutes then add:

| | |
|---|---|
| 6% cobalt naphthanate | 0.05 |
| Zirconium octoate (Zirco Drier) | 0.9 |
| 8% zinc napthanate (Zinc Drier) | 1.8 |
| Xylene | 329 |

Example XII

| | Grams |
|---|---|
| Silicone resin (methyl phenyl) polysiloxane 10% solids in mixed solvent of toluene/petroleum spirits (G.E. Dri-film 88 or Dow Corning R-671) | 200 |
| Phosphor | 10 |
| Fumed silica (Cab-o-Sil) | 2 |
| Thixotrope (MPA) | 2 |

A suitable lacquer vehicle for use in Example I is U.S. Radium Corp., #701. Also, the butyl alcohols diluent in Example I may be replaced with either toluene or xylene. The MPA suspension agent in Example I may be replaced with "Texaphor," manufactured by E. T. Horn and Company.

It is important to note that the vehicles used in the examples given are relatively transparent to UV in the range from 3000 to 4000 A., as compared with most other resins. For this reason UV screening agents are commonly employed with these resins in conventional paints. In the present invention, however, UV transparency is a beneficial characteristic and it is important that commercial vehicles to which screening agents have been added, not be employed in making up the formulations of the present invention.

Each of the above formulations may be applied to the test surface by means of a paint sprayer, roller, paint brush or the like. Example I includes a Freon propellant which would be omitted if the mixture is not to be packaged in an aerosol spray can. In all of the above-described formulations, the paint "dries" by evaporation of the solvent. Once the paint has dried it is ready for use. In use, the dry coating is subjected to thermal and ultraviolet radiation. The coating will fluoresce everywhere except where the local temperature of the substrate exceeds the quenching threshold. Hot areas will create shadows which are readily discernible and which may be photographed for permanent record.

There follows a more detailed description of a typical test procedure utilizing the coating of the invention. The surface to which the coating is to be applied is first cleaned with aliphatic naphtha or other suitable solvent and dried with clean compressed air. A 0.005 inch maximum thick coating of the thermographic paint of Example III, thinned with toluene thinner, as necessary for good spraying consistency, is sprayed onto the surface. The coating is then allowed to air dry. The coated surface is then exposed to an ultraviolet light source. The UV source should radiate in the longer wavelength end of the UV band, namely 3000 A. to 4000 A. UV in this wavelength is populary called "black light" and is obtainable from the following sources: (1) high-pressure mercury arc light covered with a filter to remove the visible light and (2) the fluorescent lamp made up with a special phosphor designated 360 BL and covered with a filter to remove the visible light. For the example given, a commercial light fixture with a type BLB lamp may be used. The optimum wavelength of UV radiation will depend upon the type of phosphor used, but typically is of the order of 3600 angstroms. A hot air source is then passed over the area to be inspected while maintaining a spacing of approximately 3 inches from the surface so as not to exceed a maximum surface temperature of 160° F. Higher temperatures are undesirable since they may have an adverse affect on the part being tested. The surface temperature of the part being inspected should normally be held to approximately 120° F., assuming that Radelin 1807 phosphor is used in the paint formulation. The hot air source may comprise a Model HG-751 hot air gun as manufactured by Master Applicances Corporation of Racine, Wis. Visible variations in the intensity of fluorescence are indicative of the thermal conductivity of the surface, as related to unbonded areas. As heat is applied to the coating, the normal fluorescence of the paint begins to darken with the increase in temperature. The presence of a void in the bond line will become visible as an area (corresponding in size and shape to the void) that is visibly darker than the surrounding areas. This is due to the locally higher temperature of the void. If the part surface is overheated, then the whole area being viewed appears dark and visual definition is lost. In a practical embodiment of the invention it has been found that a ½ inch diameter void in a laminated panel can be reliably detected through an aluminum top sheet having a thickness up to 0.035 inch. Isotherm patterns are developed by the high rate of heat input to the fluorescing surface and vary with differences in the thermal conductivity through the structure. Imperfections such as air gaps and blisters, as well as the type and mass of the base metal, will cause certain sections of the surface to heat up and therefore appear dark (hot). Bonded homogeneous areas or areas having large mass heat up more slowly and appear light (cold). The perimeter of suspected (dark) areas may be marked with a "Pentil" felt tip marking pen or similar marker employing a water-removable ink.

In the event that heat is applied to the opposite side of the structure from the thermographic coating, the thermal pattern would be reversed; the homogeneous area would appear dark, the imperfection would appear bright.

Upon completion of the inspection, the coating may be removed by an appropriate solvent or in the case of the formulations described in Examples II and III, the coating may be peeled off as an integral sheet. Where the suspect areas have been marked on the coating, the coating may be carefully peeled off so as to maintain it intact, and retained as a permanent record.

The above-described procedure readily permits nondestructive testing of laminated panels, honeycomb structures, and the like. The inspection process is repeatable in that the part can be cooled and the inspection made again so long as the paint is not removed. Contrast or definition of the shadow is a function of the substrate (e.g., metal skin) composition, thickness, size of void, and the amount of ultraviolet irradiation. By way of example, if the top skin of an adhesively-bonded honeycomb assembly consists of stainless steel sheet which is not more than 0.012 inch thick, the pattern of the honeycomb will be made clearly visible in the fluorescing coating.

A particular advantage of the organic-solvent based formulation (Example III) is that the coating may be removed from the surface to which it is applied and thereafter dissolved in an appropriate solvent for subsequent reuse. That is, the solid components of the system are recoverable and may be re-used indefinitely. Suitable solvents include acetone and methyl ethyl ketone (MEK).

In each of the exemplary formulations the relative proportions of the constituents are selected to result in a phosphor/vehicle system in which settling of the insoluble phosphor is inhibited both during and after application of the coating. It has been found that this objective can be accomplished by maintaining the composition's shear rate range between 5,000 and 20,000 reciprocal seconds. Ideally the viscosity of the composition, prior to application, should be in the range of 0.5 to 2.5 poise. The invention may be modified to adapt it to various means of application such as by paint roller, brushing, spraying, etc. It is, of course, necessary to provide a continuous and uniform layer of the phosphor on the substrate to which the coating is to be applied. As has been shown in the foregoing specification, the present invention yields of thixotropic coating composition of a granular, insoluble phosphor which is maintained in a stable suspension in an ultraviolet transmitting vehicle.

While the invention has been described in detail with particular reference to preferred embodiments thereof, it is to be understood that variations and modifications can be effected, by those skilled in the art, within the spirit and scope of the invention as described hereinabove and as defined in the appended claims.

What is claimed is:

1. An air-drying contact thermographic coating composition comprising a mixture of:
   a resin vehicle, substantially transparent to ultraviolet light in the range from 3000 A. to 4000 A., selected from the group consisting of nitrocellulose lacquer, ethyl cellulose lacquer, acrylic resin, vinyl chloride-acetate copolymer, polystyrene, alkyd resin, and silicone resin;

a powdered superlinear thermographic phosphor selected from the group consisting of silver-nickel activated zinc sulfide, silver-nickel activated zinc cadmium sulfide, and silver-nickel activated zinc cadmium selenide in an amount sufficient to yield an opaque coating upon film formation of said composition;

a volatile dispersant, selected from the group consisting of methyl isobutyl ketone, water, xylene, and toluene, in an amount sufficient to stabilize the dispersion of said phosphor in said vehicle; and a thickening agent selected from the group comprising fumed silica and ethylene glycol in an amount sufficient to result in a viscosity of said composition substantially in the range from 0.5 to 2.5 poise.

2. The composition defined in claim 1 including a compressed gas propellant.

3. The composition as defined in claim 1 including an emulsifying agent, selected from the group consisting of alkyl aryl polyether alcohol and alkyl aryl sodium sulfonate, in an amount sufficient to immobilize the phosphor in the vehicle.

4. A contact thermographic coating composition consisting essentially of:
   a silver-nickel activated zinc-cadmium sulfide thermographic phosphor;
   a lacquer vehicle which is substantially transparent to ultraviolet radiation in the range from 3000 A. to 4000 A.;
   a fumed silica thickening agent;
   methyl isobutyl ketone dispersant;
   butyl alcohol wetting agent;
   petroleum ether diluent; and
   a castor oil derivative thixotrope, said thickening agent and said thixotrope being in such proportions with respect to the remaining constituents of said composition as to result in a pre-application viscosity in the range from 0.5 to 2.5 poise.

5. The coating composition defined in claim 4 including a compressed gas propellant.

6. A composition of matter consisting essentially of, by weight, about:
   1–3.25% powdered thermographic phosphor,
   0–0.52% fumed silica,
   13–26% acrylic lacquer,
   0–0.13% castor oil derivative suspension agent,
   0–10% methyl isobutyl ketone,
   0–5% butyl alcohol,
   0–10% petroleum ether, and
   the balance being essentially all compressed gas propellant.

7. A water-based peel-coat composition of matter consisting essentially of, by weight, about:
   0–4% water,
   0–0.3% thickening agent,
   0–1.7% wetting agent,
   0–0.2% defoamer colloid,
   6–13.8% powdered thermographic phosphor, and the balance being essentially all acrylic emulsion.

8. A solvent-based peel-coat composition of matter consisting essentially of, by weight, about:
   0–30% toluene dispersant,
   0–30% acetone diluent,
   0–1.2% fumed silica thickening agent,
   0–0.4% thermal stabilizer,
   0–7.2% methyl ethyl ketone diluent,
   5–11% powdered thermographic phosphor, and the balance being essentially all ultraviolet-transmitting vinyl chloride acetate copolymer resin.

References Cited

UNITED STATES PATENTS

| | | | |
|---|---|---|---|
| 2,202,048 | 5/1940 | Einig et al. | 250—81 |
| 2,395,185 | 2/1946 | Isenberg et al. | 117—34 |
| 2,642,538 | 6/1953 | Urbach | 250—71 |
| 2,650,169 | 8/1953 | Goldstein | 117—33.5 |
| 2,744,072 | 5/1956 | Meister | 252—301.2 |

OTHER REFERENCES

Nylen et al.: Modern Surface Coatings, Interscience Publishers, New York, N.Y., 1965, p. 468.

Patton: Paint Flow and Pigment Dispersions, Interscience Publishers, New York, N.Y., 1964, pp. 4, 109, 112.

TOBIAS E. LEVOW, Primary Examiner

A. P. DEMERS, Assistant Examiner

U.S. Cl. X.R.

117—33.5; 250—71; 252—301.65; 260—13, 23